US008876948B2

(12) United States Patent
Saukaitis

(10) Patent No.: US 8,876,948 B2
(45) Date of Patent: *Nov. 4, 2014

(54) METHOD OF MAKING A COMPOSITE GAS SEPARATION MODULE

(71) Applicant: Shell Oil Company, Houston, TX (US)

(72) Inventor: John Charles Saukaitis, Katy, TX (US)

(73) Assignee: Shell Oil Company, Houston, TX (US)

( * ) Notice: Subject to any disclaimer, the term of this patent is extended or adjusted under 35 U.S.C. 154(b) by 47 days.

This patent is subject to a terminal disclaimer.

(21) Appl. No.: 13/718,804

(22) Filed: Dec. 18, 2012

(65) Prior Publication Data

US 2013/0152784 A1 Jun. 20, 2013

Related U.S. Application Data

(60) Provisional application No. 61/577,750, filed on Dec. 20, 2011.

(51) Int. Cl.

| | | |
|---|---|---|
| *B01D 53/22* | (2006.01) | |
| *B01D 71/02* | (2006.01) | |
| *B01D 69/12* | (2006.01) | |
| *B01D 67/00* | (2006.01) | |
| *C25D 5/34* | (2006.01) | |
| *C23C 18/18* | (2006.01) | |
| *C25D 5/16* | (2006.01) | |
| *C01B 3/50* | (2006.01) | |
| *B01D 69/10* | (2006.01) | |
| *C23C 18/16* | (2006.01) | |
| *C23C 18/42* | (2006.01) | |

(52) U.S. Cl.
CPC ........ *B01D 67/0039* (2013.01); *B01D 67/0055* (2013.01); *B01D 71/022* (2013.01); *C25D 5/34* (2013.01); *C23C 18/1806* (2013.01); *B01D 53/228* (2013.01); *C25D 5/16* (2013.01); *C01B 3/505* (2013.01); *B01D 67/0046* (2013.01); *B01D 67/0069* (2013.01); *B01D 67/0076* (2013.01); *B01D 69/10* (2013.01); *C23C 18/1644* (2013.01); *C23C 18/165* (2013.01); *C23C 18/1651* (2013.01); *C23C 18/1831* (2013.01); *C23C 18/42* (2013.01); *C23C 18/1692* (2013.01); *B01D 2325/08* (2013.01)
USPC ............... 95/56; 96/11; 427/270; 427/383.1; 427/404

(58) Field of Classification Search
USPC ........... 95/45, 55, 56; 96/4, 11; 427/270, 292, 427/331, 383.1, 404
See application file for complete search history.

(56) References Cited

U.S. PATENT DOCUMENTS

| | | | | |
|---|---|---|---|---|
| 6,152,987 | A  * | 11/2000 | Ma et al. ........................... | 95/56 |
| 7,175,694 | B2 | 2/2007 | Ma et al. | |
| 7,390,536 | B2 | 6/2008 | Ma et al. ....................... | 427/402 |
| 7,744,675 | B2 | 6/2010 | Saukaitis et al. .................. | 95/55 |
| 2004/0237780 | A1 * | 12/2004 | Ma et al. ........................... | 96/11 |
| 2009/0120287 | A1 * | 5/2009 | Del Paggio et al. .............. | 95/56 |
| 2009/0120293 | A1 * | 5/2009 | Saukaitis ......................... | 96/11 |
| 2011/0232821 | A1 | 9/2011 | Saukaitis et al. ................. | 156/60 |

OTHER PUBLICATIONS

Lin W. H., et al., "Characterizations of Pd-Ag Membrane Prepared by Sequential Electroless Deposition", Surface & Coatings Technology, Elsevier, Amsterdam, NL, vol. 194, No. 1, Apr. 2005, pp. 157-166.

* cited by examiner

*Primary Examiner* — Jason M Greene
(74) *Attorney, Agent, or Firm* — Charles W. Stewart

(57) ABSTRACT

A method of making a composite gas separation module by providing a porous support material having deposited thereon a metal membrane layer, by imposing upon the surface of the metal membrane layer certain surface characteristics including an abrasion pattern and a relatively high surface roughness that provides for surface activation that enhances the placement thereon of a subsequent metal membrane layer without the use of a chemical activating solution. The composite gas separation module is useful in the separation of hydrogen from hydrogen-containing gas streams.

12 Claims, No Drawings

METHOD OF MAKING A COMPOSITE GAS SEPARATION MODULE

The present application claims the benefit of U.S. Provisional Patent Application Ser. No. 61/577,750, filed Dec. 20, 2011, the entire disclosure of which is hereby incorporated by reference.

FIELD OF INVENTION

The present invention relates to a method of manufacturing and reconditioning composite gas separation modules used to separate a specific gas from a mixture of various gases.

BACKGROUND OF INVENTION

Composite gas separation modules are commonly used to selectively separate specific gases from gas mixtures. These composite gas separation modules can be made of a variety of materials, but the two most commonly used materials are polymers and metallic composites. While polymer membranes can provide an effective and cost-efficient option for the separation of gases at low temperatures, they are often unsuitable for gas separation processes that require higher temperatures and pressures; because, they tend to thermally decompose. The demand for high-temperature processing, along with tighter environmental regulations, requires composite gas separation modules that provide high flux, high selectivity, and the ability to operate at elevated temperatures.

The prior art discloses various types of and methods for making gas separation membranes that are supported upon porous substrates and that may be used in high temperature gas separation applications. Many of the known techniques for depositing thin, dense, gas-selective membrane layers onto porous substrates use techniques that often leave a surface that is not uniform in thickness. One the techniques developed to produce a membrane having a more uniform thickness described in U.S. Pat. No. 7,390,536. This patent discloses a method for fabricating a composite gas separation module by depositing a first material on a porous substrate forming a coated substrate, which may be abraded or polished to remove unfavorable morphologies from its surface forming a polished substrate. Thereafter, a gas-selective metal such as palladium or a palladium alloy can be deposited to form a dense gas-selective membrane over the porous substrate. However, there is no suggestion that such abrading or polishing may be used for the purpose of providing enhanced activation properties to the surface of a membrane layer so that chemical activation or activation by seeding the surface of a with the nuclei of a hydrogen-selective material is not required. In fact, U.S. Pat. No. 7,390,536 expressly discloses that after polishing, the surface of the polished porous substrate should be chemically activated prior to depositing a subsequent layer of a gas-selective metal.

Another method for fabricating a palladium composite gas separation module is disclosed in U.S. Patent Publication No. 2009/0120287, which presents a method of making a metallic composite gas separation membrane system. The membrane system can comprise a porous support, a first membrane layer of a gas-selective material overlying the porous support where a substantial portion of the membrane layer is removed by the use of an ultra-fine abrasive to reduce the membrane thickness, and a second layer of a gas-selective material overlaying the reduced membrane layer. The first membrane layer may comprise palladium that is deposited by multiple plating cycles. This palladium membrane layer is then abraded to remove a substantial portion of the membrane to reduce its thickness and polished to a smoother finish. A second palladium layer is subsequently deposited onto the newly reduced layer. The abrading step provides for a reduction in the membrane thickness, but there is no mention of it providing for a special surface morphology having enhanced activation properties for the placement or deposition thereon of an additional metal membrane layer.

In many of the prior art methods of making metal membranes for use in gas separation that are supported upon a porous substrate, the surface of the porous substrate and the surfaces of the metal layers and membranes between each application thereof are required to be surface activated by contacting them with an activation solution. An example of such an activation solution includes a mixture of stannous chloride ($SnCl_2$), palladium chloride ($PdCl_2$), hydrochloric acid (HCl), and water. This method of activation often requires multiple applications of the activation solution with intervening drying and, even, annealing. These wash and dry steps are laborious, they produce hazardous aqueous wastes, and they require a substantial amount of time to complete.

Another method of activation of a palladium surface utilizes palladium acetate in chloroform solution and involves evaporation, drying and decomposition of the acetate followed by reduction to palladium metal seeds.

A non-chemical method for activating the surface of metals is disclosed in U.S. 2011/0232821. However, the disclosed method employs a different surface morphology, in particular, a different surface roughness, than employed in the present inventive method.

Thus, it is desirable to have a method of making a supported metal membrane that is thin, dense and relatively uniform in thickness that may be used in the separation of gases.

It is further desirable for the method to allow for multiple metal plating steps in the manufacture of a supported metal membrane without the need for intermediate chemical activation of the surfaces of the support and of the intermediate metal membrane layers.

It is also desirable for the method to generate reduced amounts of waste products and volatile organic solvents in the manufacturing of a supported metal membrane.

BRIEF SUMMARY OF THE INVENTION

The present invention provides a highly efficient and inexpensive method of making a composite gas separation module comprising multiple membrane layers without requiring the use of chemical surface activation between the deposition of subsequent membrane layers. The method comprises the steps of: providing a porous support having a metal membrane layer; imposing onto the surface of the metal membrane layer a surface morphology that provides for an activated surface having enhanced activation properties for the placement thereon of a subsequent metal membrane layer, wherein the activated surface has an abrasion pattern and a certain mean surface roughness as hereinafter described; placing the subsequent metal membrane layer upon the activated surface; and annealing the subsequent metal membrane layer to provide an annealed metal membrane layer.

DETAILED DESCRIPTION OF THE INVENTION

The inventive method provides for the production of thin, dense gas-selective membranes by the use of multiple metal plating steps but without an intermediate treatment with an activation solution of the plated metal surfaces between the plating steps. The elimination of this surface activation by the use of an activation solution overcomes many of the problems associated with the prior art surface activation techniques. For instance, it mitigates some of the problems of slower and uneven metal plating that are caused by the use of an activation solution to activate the support and metal layer surfaces in the manufacture of a gas separation module.

The inventive method further provides for a reduction in the overall manufacturing time of a composite gas separation module by the use of an activation technique that does not use a chemical activation solution to activate the surfaces of the support and plated metal membrane layers of the gas separation module. Because no activation solution is utilized, there is no need to wash off activation solution between activation steps. This elimination of the use of an activation solution can provide an additional benefit of a more environmentally friendly process due to the reduction of aqueous wastes and volatile organic solvents that are typically generated by chemical activation methods.

Thus, the inventive method provides for the preparation, or reconditioning, or both, of a gas separation membrane system or a composite gas separation module. The inventive method may include placing a metal membrane layer of a gas-selective metal or material upon a porous support so as to provide a porous support and metal membrane layer having a surface which may be activated as described in detail herein so that a subsequent metal membrane layer may more easily be placed thereon. The porous support may also be coated with an intermetallic diffusion barrier which may be suitably placed between the porous support and the metal membrane layers. Suitable intermetallic diffusion barriers are discussed in greater detail below.

The porous support upon which the gas-selective metal membrane layer is deposited may include any porous metal material that is suitable for use as a support for the gas-selective material and which is permeable by hydrogen. The porous support may be of any shape or geometry; provided, that it has a surface that permits the layer of gas-selective material to be applied or deposited thereon. Such shapes can include planar or curvilinear sheets of the porous metal material having an undersurface and a top surface that together define a sheet thickness, or the shape of the porous substrate can be tubular, such as, for example, rectangular, square and circular tubular shapes that have an inside surface and an outside surface that together define a wall thickness and with the inside surface of the tubular shape defining a tubular conduit. In the preferred embodiment, the porous support is cylindrical.

The porous metal material can be selected from any of the materials known to those skilled in the art including, but not limited to, (1) the stainless steels, e.g., the 301, 304, 305, 316, 317, and 321 series of stainless steels, (2) the HASTELLOY® alloys, e.g., HASTELLOY® B-2, C-4, C-22, C-276, G-30, X and others, and (3) the INCONEL® alloys, e.g., INCONEL® alloy 600, 625, 690, and 718. The porous metal material, thus, can comprise an alloy that is hydrogen permeable and comprises iron and chromium. The porous metal material may further comprise an additional alloy metal such as nickel, manganese, molybdenum and any combination thereof.

One particularly desirable alloy suitable for use as the porous metal material can comprise nickel in an amount in the range of upwardly to about 70 weight percent of the total weight of the alloy and chromium in an amount in the range of from 10 to 30 weight percent of the total weight of the alloy. Another suitable alloy for use as the porous metal material comprises nickel in the range of from 30 to 70 weight percent, chromium in the range of from 12 to 35 weight percent, and molybdenum in the range of from 5 to 30 weight percent, with these weight percents being based on the total weight of the alloy. The Inconel alloys are preferred over other alloys.

The thickness (e.g. wall thickness or sheet thickness as described above), porosity, and pore size distribution of the pores of the porous metal substrate are properties of the porous support selected in order to provide a gas separation membrane system of the invention that has the desired properties and as is required in the manufacture of the gas separation membrane system of the invention.

It is understood that, as the thickness of the porous support increases, the hydrogen flux will tend to decrease when the porous support is used in hydrogen separation applications. The operating conditions, such as pressure, temperature, and fluid stream composition, may also impact the hydrogen flux. In any event, it is desirable to use a porous support having a reasonably small thickness so as to provide for a high gas flux therethrough. The thickness of the porous substrate for the typical application contemplated hereunder can be in the range of from about 0.1 mm to about 25 mm. Preferably, the thickness is in the range of from 1 mm to 15 mm. More preferably, the range is from 2 mm to 12.5 mm, and most preferably, from 3 mm to 10 mm.

The porosity of the porous metal substrate can be in the range of from 0.01 to about 1. The term porosity is defined as the proportion of non-solid volume to the total volume (i.e., non-solid and solid) of the porous metal substrate material. A more typical porosity is in the range of from 0.05 to 0.8, and, even from 0.1 to 0.6.

The pore size distribution of the pores of the porous metal substrate can vary with the median pore diameter typically in the range of from about 0.1 micron to about 50 microns. More typically, the median pore diameter of the pores of the porous metal substrate material is in the range of from 0.1 micron to 25 microns, and most typically, from 0.1 micron to 15 microns.

In the inventive method, there is initially provided a porous support which has been prepared by placing a metal membrane layer of a gas-selective metal or material thereon by any suitable means or method known to those skilled in the art. Some of the suitable means and methods of preparing and forming a metal layer upon a support are as described in U.S. Patent Publication 2009/0120287, which is incorporated herein by reference. Possible suitable means or methods for placing a metal membrane layer upon a support include, for example, the deposition of metal upon a surface by electroless plating, thermal deposition, chemical vapor deposition, electroplating, spray deposition, sputter coating, e-beam evaporation, ion beam evaporation and spray pyrolysis. A preferred deposition method is electroless plating.

The gas-selective metal or material, as the term is used herein, is a material that is selectively permeable to a gas when it is in a form of a dense (i.e., having a minimum amount of pinholes, cracks, void spaces, etc. that allow the unhindered passage of gas), thin film. Thus, a dense, thin layer of the gas-selective material functions to selectively allow the passage of the desired gas while preventing passage of other gases. Possible gas-selective metals include palladium, platinum, gold, silver, rhodium, rhenium, ruthenium, iridium, niobium, and alloys of two or more thereof. In a preferred embodiment of the invention, the gas-selective material is a hydrogen-selective metal such as platinum, palladium, gold, silver and combinations thereof, including alloys. The more preferred gas-selective material is palladium, silver and alloys of palladium and silver. The most preferred gas-selective material is palladium.

The typical membrane thickness of the gas-selective metal membrane layer can be in the range of from 1 micron to 50 microns. For many gas separation applications, however, a membrane thickness in the upper end of this range may be too thick to provide for a reasonable gas flux that allows for the selection of a desired gas. Also, various prior art manufacturing methods often provide gas separation membrane systems having the gas-selective membrane layers that are unacceptably thick such that they provide for unacceptable gas separation capability. Generally, a membrane thickness that is greater than 20 microns is too large to provide for acceptable separation of hydrogen from a gas mixture. Even a membrane thickness greater than 15 microns, or even 10 microns, is not desirable.

The inventive method provides a way of activating the surface of a porous support that has a metal membrane layer thereon, but without the chemical treatment of its surface by the application of a chemical activation solution. The purpose of the activation of the surface is to provide for the subsequent laydown of one or more metal membrane layers by deposition of, or plating with, a gas-selective metal. In certain of the prior art methods of preparing supported metal membrane systems, when multiple metal membrane layers are placed upon the surface of the porous support, there is typically a need for the surfaces of each metal membrane layer to be activated between each plating or deposition step, which is typically accomplished using chemical means. The instant method is based on the discovery that very effective surface activation of a metal membrane layer can be achieved without the use of chemical means by imposing onto the surface of the porous support having the metal membrane layer a particular surface morphology, including an abrasion pattern and especially a certain controlled mean surface roughness, as hereinafter described. The imposed surface morphology is such that it provides for an activated surface having enhanced activation properties that allow for the placement thereupon of a subsequent metal membrane layer.

The specific surface roughness that is imposed upon the surface of the supported metal membrane is an important aspect of the inventive method. The prior art indicates that the polishing of the metal surfaces of a membrane between metal deposition or plating steps is important in order to remove imperfections in the membrane layer and to provide for thin, uniform metal layers of metal membrane material upon which further layers of metal may be deposited. It has been thought that it is best to have a highly polished and smooth surface of the metal layer in between the platings. Contrary to what was previously believed, it has been found that by using an abrasive media to control the surface roughness to within a specific range as hereinafter defined, can have significant advantages with regard to activating the surface of the metal membrane, without requiring activation with the use of a chemical activating solution.

In accordance with the present invention, it found that improved activation of the surface of a supported metal membrane can be achieved if surface is abraded or polished to achieve a mean surface roughness (Sa) in the range above 0.8 microns up to 2.5 microns. Preferably the mean surface roughness (Sa) of the metal membrane to be plated is in the range of from 0.85 microns to 1.5 microns, more preferably in the range of from 0.9 microns to 1.2 microns.

The mean surface roughness or arithmetical mean height (Sa) is a known measurement for measuring the roughness of a surface and can be readily determined with the use of an optical profilometer. Any commercially available optical profilometer may be used. An example of such a commercially available optical profilometer is the ST400 3D Profilometer, which is marketed and sold by Nonovea®. In cases of highly polished surfaces, the desired surface roughness can be imposed by using an abrasive media to increase surface roughness within the desired range.

In order to get satisfactory enhanced activation over the entire membrane surface, it is desirable that surface have a uniformly applied abrasion pattern, which can be in the form of a lay pattern, which is a repetitive impression upon the surface of the supported metal membrane layer. Examples of surface finish lay patterns (also referred to herein as "abrasion patterns") include vertical, horizontal, radial, cross-hatched, circular, sinusoidal, oval, elliptical, coil, peanut shaped and other patterns. Suitable and preferred abrasion patterns and some of the methods and means for impressing or imposing such abrasion patterns upon the surface of a supported metal membrane are discussed in more detail elsewhere herein.

A preferred abrasion pattern for use in activating the surface of the supported metal membrane is a cross hatched pattern in the shape of an "X" with the intersecting lines of the cross hatching being placed at particular angles to each other and at particular scratch depths within the surface. It is preferred for the intersecting lines of the cross hatching be at an angle to each other in the range of from 10°) (170° to 90°, or from 25°) (155° to 90°, or from 30°) (150° to 90°.

Any suitable means or method known to those skilled in the art for imposing or impressing into, onto or upon a surface a desired surface roughness and abrasion pattern may be used in the inventive method. There are a wide variety of polishing and machine tools that may be used as means for imposing onto the surface of a supported metal membrane a particular surface morphology including, for example, various mechanical planarization machines and computer numerical controlled machines. The abrasion surfaces may be selected from a variety of polishing pads, abrasive belts and other abrasive surfaces.

Abrasives suitable for use in the abrading step to produce the desired surface roughness and abrasion pattern can be selected from any type of abrasive, such as, bonded abrasives, coated abrasives, and loose abrasives, including abrasive particles suspended in a liquid or abrasives contained in a paste. The size of the abrading particles should be such that they function to create a suitable abrasion pattern and to control the surface roughness in a defined range. Abrasion media having an average particle size of from 1 to 10 microns have been found to produce a suitable surface roughness. However, other abrasion media having an average particle size above or below this range can be used as long as they produce a final mean surface roughness (Sa) of above 0.8 microns up to 2.5 microns.

The composition of the abrasive particles is not critical, and the abrasive particles may be selected from the natural abrasives, such as, for example, diamond, corundum, emery, and silica, or from the manufactured abrasives, such as, for example, silicon carbide, aluminum oxide (fused, sintered, sol-gel sintered), boron carbide, and cubic boron nitride.

Any suitable means or method for placing the subsequent metal membrane layers of gas-selective metal upon the activated surface may be used including those disclosed in US Publication No. US 2009/0120287.

After the placement of each subsequent metal membrane layer upon an activated surface, the subsequent metal membrane layer is preferably annealed. The annealing or heat treatment of each subsequent metal membrane layer may be suitably accomplished at a temperature between 400° C. and 800° C., preferably between 500° C. and 550° C. The annealing of the aforementioned layer(s) can be carried out in a hydrogen atmosphere or and inert gas such as nitrogen, argon or helium. In a preferred embodiment, the annealing is accomplished in an atmosphere of 100% hydrogen, or an atmosphere comprising a mixture of hydrogen and 3 wt % to 97 wt % of an inert gas selected from the group consisting of nitrogen, argon and helium. The surface activation, the placement of the subsequent metal membrane layer, and the annealing steps may be repeated one or more times to provide the final sealed, leak-tight composite gas separation module of the invention.

In one embodiment of the invention, a surface morphology is imposed upon the surface of a metal membrane layer supported on a porous tube by placing the porous tube in any suitable turning machine means for rotating the tube about a horizontal axis such as a lathe. An abrading means such as a linear polishing belt or polishing pad or any other suitable abrading device is pressed against the rotating tube having the metal membrane on its outer surface. The orientation of the abrading device relative to the tube and the relative rotating tube speed and rotating or moving abrading device speed all may be adjusted in a way so as to provide the desired abrasion patterns and surface roughness parameters. The rotational speed of the tube typically depends upon the particular equipment used. For instance, buffing machine can operate at rotational speeds of from 3000 rpm to 6000 rpm, or lathes can operate at rotational speeds of from 10 to 500 rpm. When a lathe is used as the rotating means the preferred rotational speed is between 20 to 250 revolutions per minute (rpm).

As discussed above, the improved method of the invention preferably includes the application of an intermetallic diffusion barrier to the surface of the porous substrate, prior to placing thereon the layers of gas-selective material using the non-chemical surface activation technique. Suitable intermetallic diffusion barriers include particles of a material selected from the group consisting of inorganic oxides, refractory metals and noble metal eggshell catalyst. These particles are to be of the size so that they, or at least a portion of the particles, can fit, at least partially, within certain of the pores of the porous substrate used to support the palladium-silver membrane. Thus, they generally should have a maximum dimension of less than about 50 microns (μm).

The particle size (i.e., the maximum dimension of the particle) of the particles will, also, generally, depend on the pore size distribution of the pores of the porous substrate used in the inventive method. Typically, the median particle size of the particles of inorganic oxides, refractory metals or noble metal eggshell catalyst will be in the range of from 0.1 micron to 50 microns. More specifically, the median particle size is in the range of from 0.1 micron to 15 microns. It is preferred for the median particle size of the particles to be in the range of from 0.2 micron to 3 microns.

Examples of inorganic oxides that may suitably be used as the layer of intermetallic diffusion barrier particles include alumina, silica, zirconia, stabilized zirconias such as yttria or ceria stabilized zirconia, titania, ceria, silicon, carbide, chromium oxide, ceramic materials, and zeolites. The refractory metals may include tungsten, tantalum, rhenium, osmium, iridium, niobium, ruthenium, hafnium, zirconium, vanadium, chromium and molybdenum. As for the noble metal eggshell catalyst that may suitably be used as a layer of intermetallic diffusion barrier particles that is applied to the surface of the porous substrate, the noble metal eggshell catalyst is defined and described in great detail in U.S. Pat. No. 7,744,675, the entire text of which is incorporated herein by reference. A preferred intermetallic diffusion barrier for use in the inventive method is noble metal eggshell catalyst comprising zirconia stabilized with yttria, in particular zirconia stabilized with 6 to 8 wt % yttria. In some cases the addition of ceria has also been found to increase stabilization.

The layer of intermetallic diffusion barrier particles applied to the surface of the porous substrate to provide a coated substrate should be such as to cover the pores of the porous substrate and to provide a layer having a layer thickness that is greater than 0.01 micron, and, generally, in the range of from 0.01 micron to 25 microns. It is preferred for the layer thickness of the intermetallic diffusion barrier to be in the range of from 0.1 micron to 20 microns, and, most preferably, from 2 microns to 3 microns.

Following application of the intermetallic diffusion barrier to the porous substrate, one or more layers of a gas selective material can be deposited on the coated porous substrate using any suitable means or method known to those skilled in the art, such as, for instance, electroless plating, thermal deposition, chemical vapor deposition, electroplating, spray deposition, sputter coating, e-beam evaporation, ion beam evaporation and spray pyrolysis. A preferred deposition method for depositing the gas-selective material on the coated porous substrate is electroless plating. Prior to the deposition of each layer of gas-selective material, the surface of the previous layer will activated employing the previously described non-chemical surface activation technique of the invention.

The composite gas separation module made in accordance with the present method may be used in the selective separation of a select gas from a gas mixture. The composite gas separation membrane module is particularly useful in the separation of hydrogen from a hydrogen-containing gas stream, especially, in high temperature applications. One example of a high temperature application in which the inventive gas separation membrane may be used is in the steam reforming of a hydrocarbon, such as methane, to yield carbon monoxide and hydrogen, followed by the reaction of the yielded carbon monoxide with water in a so-called water-gas shift reaction to yield carbon dioxide and hydrogen. These catalytic reactions are equilibrium type reactions, and the inventive gas separation membrane is useful in the simultaneous separation of the yielded hydrogen while conducting the reactions in order to enhance the equilibrium conditions to favor hydrogen yield. The reaction conditions under which the reactions are simultaneously conducted can include a reaction temperature in the range of from 400° C. to 600° C. and a reaction pressure in the range of from 1 to 30 bars.

As already noted, the inventive gas separation module can be used in a wide variety of applications that involve the separation of hydrogen from gas streams that comprise other gases, for example, those selected from the group of gases consisting of carbon dioxide, water, methane or mixtures thereof. In such applications, the temperature conditions can be in the range upwardly to 600° C., for instance, in the range of from 100° C. to 600° C., and the pressure conditions can be in the range upwardly to 60 bar, for instance, in the range of from 1 to 60 bar.

The following examples are provided to further illustrate the invention, but they are not, however, to be construed as limiting its scope.

EXAMPLES

The following examples illustrate the preparation of composite gas separation modules employing the present method wherein the surface of each palladium layer, prior to deposition of a subsequent palladium layer, was activated by imposing an abrasion pattern and surface roughness within the above-specified mean surface roughness (Sa) range. Activation of the palladium surface by abrasion in accordance with the invention allowed for continued electroless plating of the palladium layers without any chemical activation.

Example 1

A slurry of noble metal eggshell catalyst comprising palladium and yttria stabilized zirconia was deposited on the surface of 1" OD×15" porous metal tube to form an intermetallic diffusion barrier having a thickness of 2-3 microns. Thereafter, a first film of palladium was deposited on the porous tube coated with the intermetallic diffusion barrier by circulating a palladium bath solution containing 198 ml of 28-30% ammonium hydroxide solution, 4.0 grams tetraamine palladium (II) chloride, 40.1 grams disodium EDTA, and sufficient deionized water to make a 1 liter total volume, over the surface of the coated porous tube until a first palladium layer having a thickness of 1-2 microns was obtained. The palladium layer was washed, dried, and annealed at 520° C. in an atmosphere comprising a mixture of 3 vol % hydrogen in nitrogen.

The surface of the annealed palladium layer on the coated porous tube was then polished, i.e., abraded, on a lathe at 20 rpm with sandpaper attached to a sanding block. Three different abrasive papers having average particle sizes of 7-8 microns, 6 microns and 5 microns, respectively, (as determined by a scanning electron microscope), were utilized for the polishing/activation operation, starting with the larger particle size paper and finishing with the five micron paper. Pressure was applied to the sanding block which was placed against the surface of the support. Starting at one end of the support, the sand paper was slowly moved up and across the support until reaching the opposite end. The process was repeated starting on the other end. Clockwise and counter clockwise rotation was utilized. The motion was repeated until the sandpaper had a smooth shine on it or there was grit missing. The polishing steps were repeated using gradually decreasing sandpaper sizes. In the final polishing step, the surface of the plated support was lightly cross-hatched using a fresh piece of 5 micron sandpaper, thereby activating the palladium surface, which was subsequently plated with a layer of palladium without chemical activation.

The mean surface roughness (Sa) of the polished palladium surface by optical profilometry was 1.62. The plating, washing, drying, annealing and abrading to activate the surface steps were repeated until a leak tight membrane was achieved. The membrane had a permeance of 26 $Nm^3/m^2/hr$ and no leak development was detected at 15 psi after testing.

Example 2

The procedure described in Example 1 was repeated on seven different porous metal supports. The average mean surface roughness (Sa) after each of six polishing/activation steps is shown in the following table. Generally, four to eight polishing/activating and subsequent plating steps were required to produce a gas-tight membrane. The palladium surface was not polished after the final plating step.

| Polishing/Activation Step | Average Sa Values |
|---|---|
| Post 1st Polish/Activation | 1.289 |
| Post 2nd Polish/Activation | 1.043 |
| Post 3rd Polish/Activation | 0.929 |
| Post 4th Polish/Activation | 0.932 |
| Post 5th Polish/Activation | Not available |
| Post 6th Polish/Activation | 1.295 |

The mean surface roughness values (Sa) of the supports the at various stages in the above examples were measured using a ST400 Optical Profilometer marketed and sold by Nanovea®.

While this invention has been described with reference to preferred embodiments thereof, it will be understood by those skilled in the art that various modifications in form and detail may be made therein without departing from the scope of the invention set forth in the following claims.

What is claimed is:

1. A method of making a composite gas separation module, wherein said method comprises:
   providing a porous support having a metal membrane layer thereon with a surface;
   imposing onto the surface of said metal membrane layer by use of an abrasive media, a surface morphology that provides for an activated surface having enhanced activation properties for the placement thereon of a subsequent metal membrane layer, wherein said activated surface has an abrasion pattern and a mean surface roughness (Sa) in the range of from above 0.8 micron up to 2.5 microns;
   placing said subsequent metal membrane layer upon said activated surface, without further activation with a chemical activating solution; and
   annealing said subsequent metal membrane layer to provide an annealed metal membrane layer.

2. The method as recited in claim 1, wherein the activated surface has a mean surface roughness (Sa) in the range of from 0.85 micron to 1.5 microns.

3. The method as recited in claim 2, wherein the metal membrane layer whose surface is activated comprises palladium.

4. The method as recited in claim 3, wherein an intermetallic diffusion barrier is placed between said porous support and said palladium membrane layer.

5. The method as recited in claim 2, wherein the abrasive media used to impose the specified mean surface roughness has an average particle size of from 1 to 10 microns.

6. The method as recited in claim 5, wherein the abrasion pattern is selected from a group of geometric patterns consisting of vertical, horizontal, radial, cross-hatched, circular, sinusoidal, oval, elliptical, coil, peanut shaped and figure eight.

7. The method as recited in claim 1, wherein said activated surface has a mean surface roughness (Sa) in the range of from 0.9 micron to 1.2 microns.

8. The method as recited in claim 5, wherein the abrasion pattern is a cross-hatched pattern.

9. The method as recited in claim 4, wherein the abrasive particles are selected from the group consisting of diamond, corundum, emery, silica, silicon carbide, aluminum oxide, boron carbide and cubic boron carbide.

10. The method as recited in claim 8, wherein the temperature at which the subsequent metal membrane layer is annealed is between 400° C. and 800° C.

11. A composite gas separation module made by the method of claim 1.

12. A method of for separating hydrogen from a hydrogen-containing gas mixture by passing said gas mixture through the composite gas separation module made by the method of claim 1.

* * * * *